(12) United States Patent
Adelman

(10) Patent No.: US 11,516,328 B2
(45) Date of Patent: Nov. 29, 2022

(54) SYSTEMS AND METHODS FOR AN ADJUSTABLE, QUCK RELEASE, POSITIVE PRESSURE, ELECTRONIC DEVICE HOLDER

(71) Applicant: Nite Ize, Inc., Boulder, CO (US)

(72) Inventor: Gregory M. Adelman, Boulder, CO (US)

(73) Assignee: Nite Ize, Inc., Boulder, CO (US)

( * ) Notice: Subject to any disclaimer, the term of this patent is extended or adjusted under 35 U.S.C. 154(b) by 0 days.

(21) Appl. No.: 17/075,929

(22) Filed: Oct. 21, 2020

(65) Prior Publication Data

US 2022/0124190 A1 Apr. 21, 2022

Related U.S. Application Data

(63) Continuation-in-part of application No. 29/755,437, filed on Oct. 20, 2020, and a continuation-in-part of application No. 29/755,438, filed on Oct. 20, 2020.

(51) Int. Cl.
*H04M 1/04* (2006.01)
*F16M 13/02* (2006.01)
(Continued)

(52) U.S. Cl.
CPC .............. *H04M 1/04* (2013.01); *F16B 2/12* (2013.01); *F16B 2/185* (2013.01); *F16M 13/02* (2013.01)

(58) Field of Classification Search
USPC .......... 248/154, 411, 229.2, 229.22, 229.24; 361/679.3
See application file for complete search history.

(56) References Cited

U.S. PATENT DOCUMENTS

| 2,907,085 A | 10/1959 | Bosland |
| 4,319,097 A | 3/1982 | Liautaud |

(Continued)

FOREIGN PATENT DOCUMENTS

| CN | 304646653 S | 5/2018 |
| CN | 306093100 | 10/2020 |

(Continued)

OTHER PUBLICATIONS

Adjustable Handlebar Mount for Tables or Phones, date not known [online], retrieved on Aug. 5, 22, retrieved from the Internet: <https://untilgone.com/products/adjustable-handlebar-mount-for-tablets-or-phones.html?>(Year: 2022).

(Continued)

*Primary Examiner* — Alfred J Wujciak
(74) *Attorney, Agent, or Firm* — Potomac Law Group, PLLC

(57) ABSTRACT

A system for holding an electronic device includes a body portion, the body portion having a surface. The system further includes a first gripping plate and a second gripping plate, each of the first and second holding pieces including a holding surface approximately perpendicular to the surface. The system further includes a first and second arm interconnected with the first and second gripping plate such that the first and second arm are rotationally movable and the first and second gripping plate are linearly moveable, the first and second gripping plate spring driven to move together, the first and second gripping plate configured to move apart when the first and second arm are moved together, the first and second gripping plate being complementarily shaped to hold the electronic device.

15 Claims, 17 Drawing Sheets

(51) Int. Cl.
  *F16B 2/12* (2006.01)
  *F16B 2/18* (2006.01)

(56) References Cited

U.S. PATENT DOCUMENTS

| | | | |
|---|---|---|---|
| 4,492,036 A | 1/1985 | Beckwith | |
| 5,214,857 A | 6/1993 | McMurtry et al. | |
| 5,593,124 A | 1/1997 | Wang | |
| 5,825,874 A | 10/1998 | Humphreys et al. | |
| 5,845,885 A | 12/1998 | Carnevali | |
| 5,931,440 A | 8/1999 | Miller | |
| 5,979,724 A | 11/1999 | Loewenthal | |
| 5,992,807 A | 11/1999 | Tarulli | |
| 6,135,408 A | 10/2000 | Richter | |
| 6,149,116 A | 11/2000 | Won | |
| 6,269,544 B1 | 8/2001 | Pahk et al. | |
| 6,305,656 B1 | 10/2001 | Wemyss | |
| 6,350,076 B1 | 2/2002 | Wagner | |
| 6,352,228 B1 | 3/2002 | Buerklin | |
| 6,382,482 B1 | 5/2002 | Chao | |
| 6,888,940 B1 | 5/2005 | Deppen | |
| 6,919,787 B1 | 7/2005 | Macken | |
| 7,080,812 B2 | 7/2006 | Wadsworth et al. | |
| 7,110,194 B2 | 9/2006 | Hubbs | |
| 7,162,281 B2 | 1/2007 | Kim | |
| 7,163,181 B2 | 1/2007 | Omps | |
| 7,374,142 B2 | 5/2008 | Carnevali | |
| 7,431,251 B2 | 10/2008 | Carnevali | |
| 7,469,869 B2 | 12/2008 | Killian | |
| 8,398,155 B2 | 3/2013 | Andochick | |
| D707,672 S | 6/2014 | Lai | |
| 8,757,461 B2 | 6/2014 | Zanetti | |
| 8,900,009 B2 | 12/2014 | Hornick et al. | |
| 8,998,048 B1* | 4/2015 | Wu | F16M 11/10 224/420 |
| 9,080,714 B2 | 6/2015 | Minn et al. | |
| D750,612 S | 3/2016 | Chen | |
| D817,317 S | 5/2018 | Lee | |
| D833,369 S | 11/2018 | Lan | |
| 10,259,400 B1* | 4/2019 | Song | B60R 11/0235 |
| D875,090 S | 2/2020 | Leeds-Frank et al. | |
| D877,066 S | 3/2020 | Zhang | |
| D879,090 S | 3/2020 | Chung | |
| 10,598,199 B1* | 3/2020 | Fan | B60R 11/02 |
| D881,200 S | 4/2020 | Leeds-Frank | |
| D889,454 S | 7/2020 | Liu | |
| D892,787 S | 8/2020 | Chen | |
| D894,829 S | 9/2020 | Zhang et al. | |
| D895,544 S | 9/2020 | Zhao | |
| D895,601 S | 9/2020 | Liao | |
| D896,177 S | 9/2020 | Zheng | |
| D900,087 S | 10/2020 | Leeds-Frank et al. | |
| D908,689 S | 1/2021 | Chen et al. | |
| 11,027,665 B1* | 6/2021 | Cao | B60R 11/0241 |
| D926,107 S | 7/2021 | Leeds-Frank et al. | |
| D926,108 S | 7/2021 | Leeds-Frank et al. | |
| D928,041 S | 8/2021 | Jones | |
| D931,204 S | 9/2021 | Liao | |
| D934,235 S | 10/2021 | Liao | |
| 2003/0019893 A1 | 1/2003 | Decoteau | |
| 2004/0040994 A1 | 3/2004 | Parcelles | |
| 2004/0188576 A1 | 9/2004 | Carnevali | |
| 2005/0156088 A1* | 7/2005 | Wadsworth | B60R 11/02 248/309.1 |
| 2005/0247845 A1 | 11/2005 | Li et al. | |
| 2007/0099469 A1 | 5/2007 | Sorensen | |
| 2008/0061197 A1 | 3/2008 | Carnevali | |
| 2008/0078793 A1 | 4/2008 | Brown | |
| 2008/0087779 A1 | 4/2008 | Liow et al. | |
| 2008/0203260 A1 | 8/2008 | Carnevali | |
| 2009/0102986 A1 | 4/2009 | Yamamoto | |
| 2009/0196597 A1 | 8/2009 | Messinger et al. | |
| 2009/0294617 A1 | 12/2009 | Stacey et al. | |
| 2009/0317071 A1 | 12/2009 | David | |
| 2009/0322278 A1 | 12/2009 | Franks et al. | |
| 2010/0034530 A1 | 2/2010 | Son | |
| 2010/0327031 A1 | 12/2010 | Olmos | |
| 2011/0183728 A1 | 7/2011 | Lin | |
| 2011/0192857 A1 | 8/2011 | Rothbaum et al. | |
| 2011/0266409 A1* | 11/2011 | Warrick | F16B 2/12 248/316.5 |
| 2012/0097723 A1 | 4/2012 | Khatchatrian | |
| 2012/0212968 A1 | 8/2012 | Brown | |
| 2012/0305733 A1 | 12/2012 | Vogel et al. | |
| 2013/0292296 A1 | 11/2013 | Kang et al. | |
| 2014/0009900 A1 | 1/2014 | Yeo | |
| 2014/0103087 A1 | 4/2014 | Fan | |
| 2014/0138419 A1 | 5/2014 | Minn et al. | |
| 2014/0168890 A1 | 6/2014 | Barnard | |
| 2016/0080022 A1 | 3/2016 | Radmard | |
| 2020/0191178 A1* | 6/2020 | Yang | F16B 2/12 |
| 2020/0252494 A1* | 8/2020 | Li | B60R 11/0241 |

FOREIGN PATENT DOCUMENTS

| | | |
|---|---|---|
| GB | 6088007 S | 4/2020 |
| JP | 1667077 S | 8/2020 |
| KR | 3020190000593 S | 5/2019 |

OTHER PUBLICATIONS

Bike Phone Mount, Motorcycle Phone Holder, Nov. 28, 2020 [online], retrieved Aug. 5, 22, retrieved from the Internet <http://www.amazon.com/dp/B08P84WF4S> (Year: 2020).

Nite Ize Squeeze Rotating Smartphone Bar Mount, Dec. 15, 2020 [online], retrieved on Aug. 11, 22, retrieved from the Internet: <https://www.amazon.com/Nite-Ize-Smartphone-Universal-Compatible/dp/B08QR6KK4D> (Year:2020).

* cited by examiner

SYSTEMS AND METHODS FOR AN ADJUSTABLE, QUCK RELEASE, POSITIVE PRESSURE, ELECTRONIC DEVICE HOLDER

CROSS REFERENCE TO RELATED APPLICATIONS

This application is a continuation-in-part of U.S. patent application Ser. No. 29/755,438 filed Oct. 20, 2020 and U.S. patent application Ser. No. 29/755,437 filed Oct. 20, 2020. These applications are hereby incorporated by reference.

BACKGROUND

The use of electronic devices such as smart phones is ubiquitous by consumers. Users take smart phones everywhere with them and are constantly on the body of people everywhere. At times, however, it is desirable to mount a smart phone (or another electronic device) in a hands-free holder or other configuration that does not require the user to hold the smart phone. Throughout this disclosure, the term electronic device will be used; however, other devices such as tablets or any other electronic device also may be used with the systems described herein. Although solutions are available, it is desirable to have a holder that can firmly hold a variety of sizes of electronic devices and quickly release the same electronic device.

BRIEF SUMMARY

In one embodiment, a system for holding an electronic device includes a body portion, the body portion having a surface. The system further includes a first gripping plate and a second gripping plate, each of the first and second holding pieces including a holding surface approximately perpendicular to the surface. The system further includes a first and second arm interconnected with the first and second gripping plate such that the first and second arm are rotationally movable and the first and second gripping plate are linearly moveable, the first and second gripping plate spring driven to move together, the first and second gripping plate configured to move apart when the first and second arm are moved together, the first and second gripping plate being complementarily shaped to hold the electronic device. Alternatively, the first gripping plate includes a first bracket, the first bracket attached to the first arm and the second arm. In another alternative, the first and second arm are mounted at a first and second rotation point, respectively, and the first bracket is attached to the first arm at a first radial distance from the first rotation point and to the second arm at a second radial distance from the second rotation point. In one alternative, the first bracket is attached to the first arm and the second arm via a post-in-slot system. In another alternative, the second bracket is attached to the first arm at the second radial distance from the first rotation point and to the second arm the first radial distance from the second rotation point and the second bracket is attached to the first arm and the second arm via a post-in-slot system. Alternatively, second bracket and the first bracket interconnect with the first arm in locations opposite the first rotation point. In another alternative, the first and second arm are interconnected via gearing. Alternatively, the first and second arm are spring-loaded and thereby cause the first and second gripping plate to be spring driven. In another alternative, the first and second bracket, the gearing, and the post in slot system convert the rotational motion of the first and second arms to linear motion in and out of the first and second gripping plate. Alternatively, a magnetic interconnect device is mounted on the body portion. In another alternative, a cylindrical mounting device is mounted on the body portion. Alternatively, the cylindrical mounting device includes a strap and prong attachment mechanism. In another alternative, the cylindrical mounting device includes a flat spring which flexes to allow the cylindrical mounting device to rotate. Alternatively, first and second rotation point are located on a line in-line with a direction of movement of the first and second gripping plates. In another alternative, the first and second rotation point are separated from each other.

In one embodiment, a mounting system for an electronic device includes a gripping area is provided for gripping an electronic device, wherein the gripping area is spring loaded to provide gripping force between a first and a second gripping plate. The mounting system further includes a first and second release lever, configured to release the gripping force of the gripping area when the first and second release lever are pushed together, the first release lever mounted at a first central rotation point and the second lever mounted at a second central rotation point. In one alternative, the first and a second gripping plate move in a plane of movement in and out. Alternatively, the first and second release levers move in a rotational fashion and rotational movement of the first and second release levers is converted to a single plane of movement for the first and a second gripping plates by via gearing between the first and second release levers and a first and second sliding bracket for the first and second gripping plates that are each attached to a first one of the first and second release levers at a first location and a second one of the first and second release levers at a second location. In another alternative, the first location on the first release lever is a first distance from the first central rotation point and the second location of the second release lever is the same first distance from the second central rotation point. Alternatively, the first and second release lever rotate inward the first and second gripping plate release.

In one embodiment, a method of mounting an electronic device includes providing holding system, the holding system including a body portion, the body portion having a surface. The holding system further including a first gripping plate and a second gripping plate, each of the first and second holding pieces including a holding surface approximately perpendicular to the surface. The holding system further including a first and second arm interconnected with the first and second gripping plate such that the first and second arm are rotationally movable and the first and second gripping plate are linearly moveable, the first and second gripping plate spring driven to move together, the first and second gripping plate configured to move apart when the first and second arm are moved together, the first and second gripping plate being complementarily shaped to hold the electronic device. The method further includes pushing the first and second arm together. The method further includes inserting the electronic device between the first and second gripping plate. The method further includes releasing the first and second arm. In one alternative, the method further includes pushing the first and second arm together. The method further includes removing the electronic device between the first and second gripping plate. The method further includes releasing the first and second arm.

DETAILED DESCRIPTION

Figure 1:
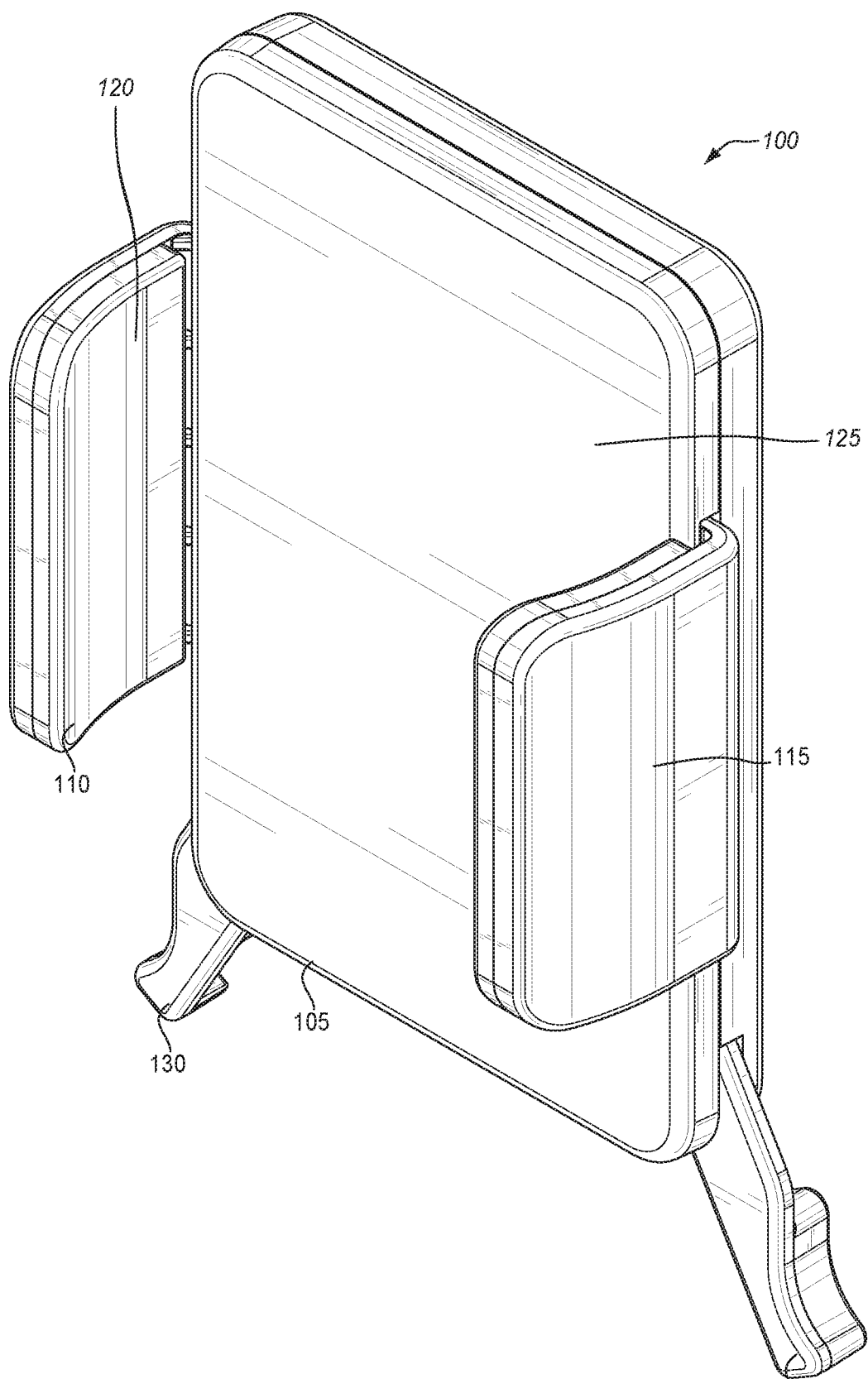
FIG. 1 show a front perspective view of one embodiment of a Device Holder.

Certain terminology is used herein for convenience only and is not to be taken as a limitation on the embodiments of the systems and methods for an adjustable, quick release, positive pressure, electronic device holder with quick release functions (Device Holder). In the drawings, the same reference numbers are employed for designating the same elements throughout the several figures. Herein, the Device Holder is designed for various electronic devices, such as smart phones, tablets, and other electronic devices that typically have a screen oriented towards the user. Although electronic devices of smart phones and tablets are most commonly used with the Device Holder, embodiments may be designed to removably attach to a wide variety of electronic devices or other items that have a back that may rest against the device holder and can generally be held by the clamps closing around the sides of the device or item.

In many embodiments, the Device Holder includes two pivot points. These may be referred to as rotation points as well. The inclusion of two pivot points allows for the Device Holder to include hand levers, whose movement remains within the ergonomic range of a human hand while giving the clamps enough range on the X-axis to accommodate the range of phone widths. Additionally, the Y-axis movement of the top ends of the levers is minimized, which is necessary for the device to maintain a reasonable level of complexity. If the Y-axis movement of the top ends of the levers were increased, then there would be difficulty compensating for this movement, while translating the X-axis movement of the levers to the clamps. This also holds true for the bottom ends of the levers where the clamps (the frames thereof) interconnect with the ends of the levers. In other words, the hand levers of the device need to be positioned so that the handles on their ends are close enough in full open position to allow a human hand to squeeze them together while the clamps can move in the range they need to accommodate all the desired sizes of devices. The inclusion of two pivot points for the hand levers (levers 130, 135) allows for greater linear movement of the clamps (gripping plates 110, 115) for a given Y-axis movement. In some embodiments, the inclusion of two pivots points for the hand levers allows for twice the linear movement of the clamps within a comparable Y-Axis range as compared to a dual lever system with a single pivot point.

By setting the pivot points apart, the rotational motion of the levers may be translated to horizontal movement of the clamps in the range where the rotational movement of the connection points (between the clamps and the lever arms) is predominately in the x-axis direction (the direction of movement of the clamps) while maintaining a reasonable lever arm length. This can be explained by the Cosine function, since the Cosine of an angle equals the x-value of the endpoint on the unit circle. If the horizontal movement of the clamps is considered the x axis, when the levers are positioned at ½ π radians, the Cosine function is 0. From ½ π to either ¼ or ¾ π radians, the majority of x axis movement occurs (the Cosine of ¼ π is approximately 0.7, so from ½ π to ¼ π radians approximately seventy percent of the x-axis movement has already occurred). The levers and clamps in embodiments of the Device Mount are situated to accommodate a smart phone, the smart phone typically having a body width and height that are similar in proportion to the total width and height of the Device Holder. (Practically, users want a mount (such as the Device Mount) that is probably less than twice as wide and less than twice as long as a smart phone, and probably less than 1.5 times as wide and long, therefore being approximately on the same scale. If infinite width a length of the Device Holder and an accompanying infinite length of the lever arms were practically possible, then it would be easy to keep the radial rotation close to ½ π radians.) In terms of the actual plate that the phone rest on, named gripping plate herein in some embodiments, the plate is slightly less than the expected width of the expected smart phone and typically less than the height of the expected smart phone. If the levers were mounted at a single point, in order to accommodate the usual minimum width of a smart phone, the levers would be already rotated close to ¼ π radians (45 degrees) from ½ π of rotation off of the x-axis (in other words, ¼ π radians (45 degrees) off of the y-axis). Here, additional movement of interconnection point of the levers will primarily be in the y-axis direction, since the Cosine of values of from 0 to ¼ π radians and from ¾ π to π radians are generally smaller in terms of absolute x-axis movement. Therefore, by oriented the lever arms apart, the lever arms start in a position close to parallel with the y-axis (a ½ π radian rotation), but still accommodate the minimum expected width of the smart phone. In this case as in many of the embodiments described herein, the rotation of the lever arms will primarily translate to x-axis movement of the clamps from this starting position, maximizing the usefulness of the device and the effectiveness of squeezing the lever arms.

Another feature is the gearing between the two levers. The inclusion of two pivot points enables this gearing in many configurations. The gearing and the two pivot points function to keep the levers and clamps mechanically synchronized. Furthermore, they remove the need for linear guides/tracks for the clamps (which is an advantage because the guides create tolerance and friction issues). Finally, they keep the clamps and device always centered (naturally without having to add other features/stops).

In many embodiments, the clamps stack on top of the lever arms, attaching at the top and bottom. The bottom legs of the clamps stack on top of each other, which allows the clamps to attach to the levers on both sides of the pivot points. These dual attachment points on the levers on each side of the pivot points greatly increase the stability and strength of the clamps.)—Additionally, the levers are about twice the length on the bottom side of the pivot points so the distance traveled at the ends of the levers approximately doubles, compared to the forces required to push on the ends of the levers. In other words, clamp force on the device is about double the force required to squeeze the levers. Additionally, in many embodiments the Device Holder uses a constant force (also called clock springs) springs in the design deliver a relatively flat/constant force curve over to the whole clamping range. The force does increase as they are compressed (but not as much as other types of springs) and this may be desirable since the clamping force is increased on the larger/heavier devices, which need more holding force.

FIG. 1 show a front perspective view of one embodiment of a Device Holder 100. Generally, Device Holder 100 includes a central housing 105. Central housing 105 includes adjustment, tension, and locking mechanisms to provide for the adjustment of the Device Holder 100 to hold different-sized electronic devices (like smartphones). On either side of central housing 105, gripping plates 110, 115 are located. Gripping plates 110, 115 may include an internal gripping area 120. In some embodiments, the gripping area may be composed of a compressible material. Gripping area 120 may be contoured as shown or in various other fashions, which increase the compressibility of the material while also increasing the friction offered by the material. Gripping area 120 may be a TPR (thermoplastic rubber) 40 SHORE A overmold. Gripping area 120 may be a TPR (thermoplastic rubber) from 5 to 100 SHORE A overmold. Alternatively, silicon, rubber, and other materials may be used. Similarly, plate area 125 on central housing 105 may similarly include gripping material or simply be flat. Gripping plates 110, 115 may be flat, angled, or contoured in order to provide complementary holding of an electronic device. Device Holder 100 also includes release levers 130, 135. When these levers are pushed inwards, the gripping plates 110, 115 extend away from each other and outward. When levers 130, 135 are released, gripping plates 110, 115 spring towards each other (positive pressure). In this way any electronic device between them is gripped, while being easily releasable via levers 130, 135.

Figure 2:
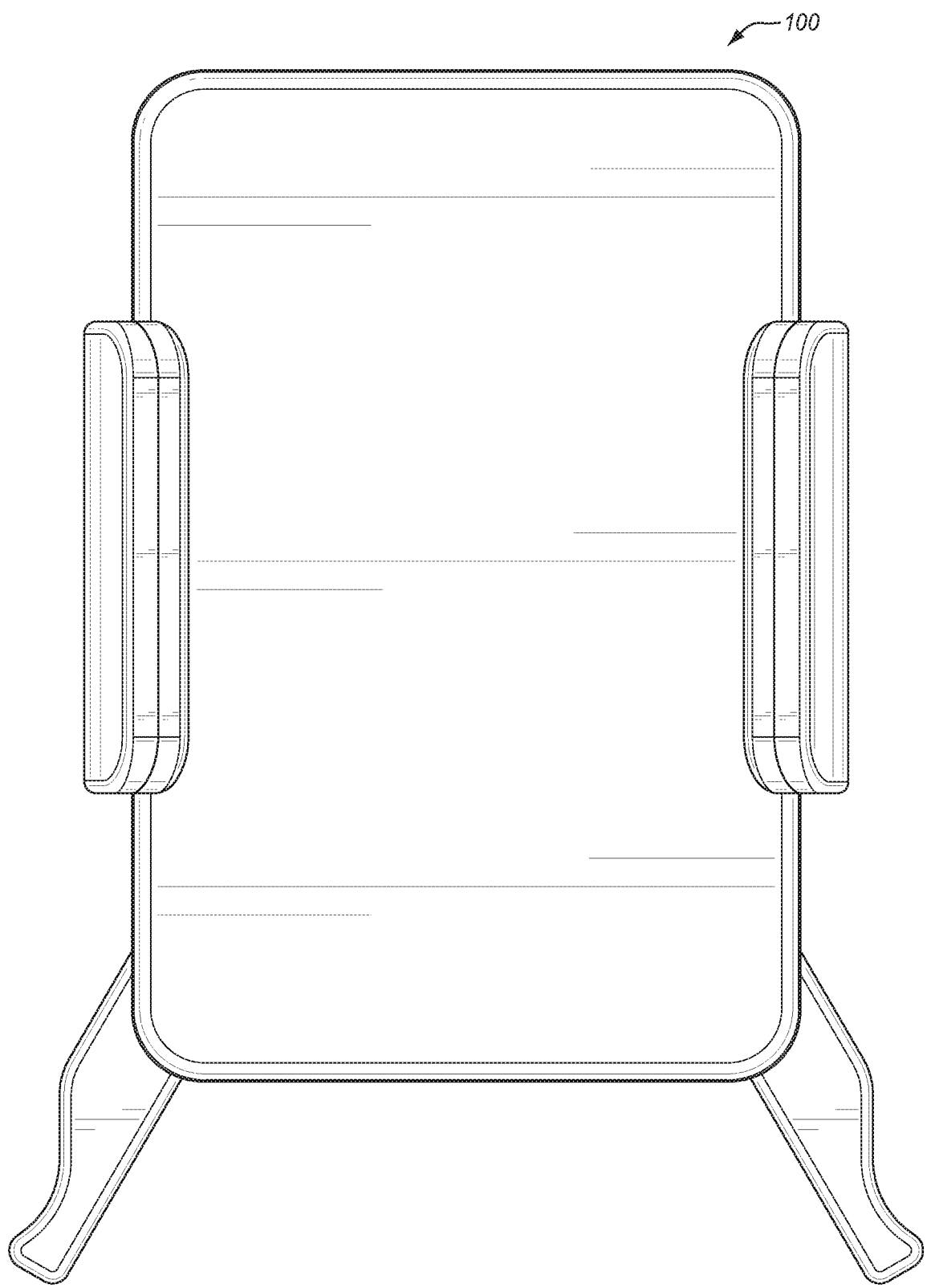
FIG. 2 shows a front view of the Device Holder of FIG. 1.
Figure 3:
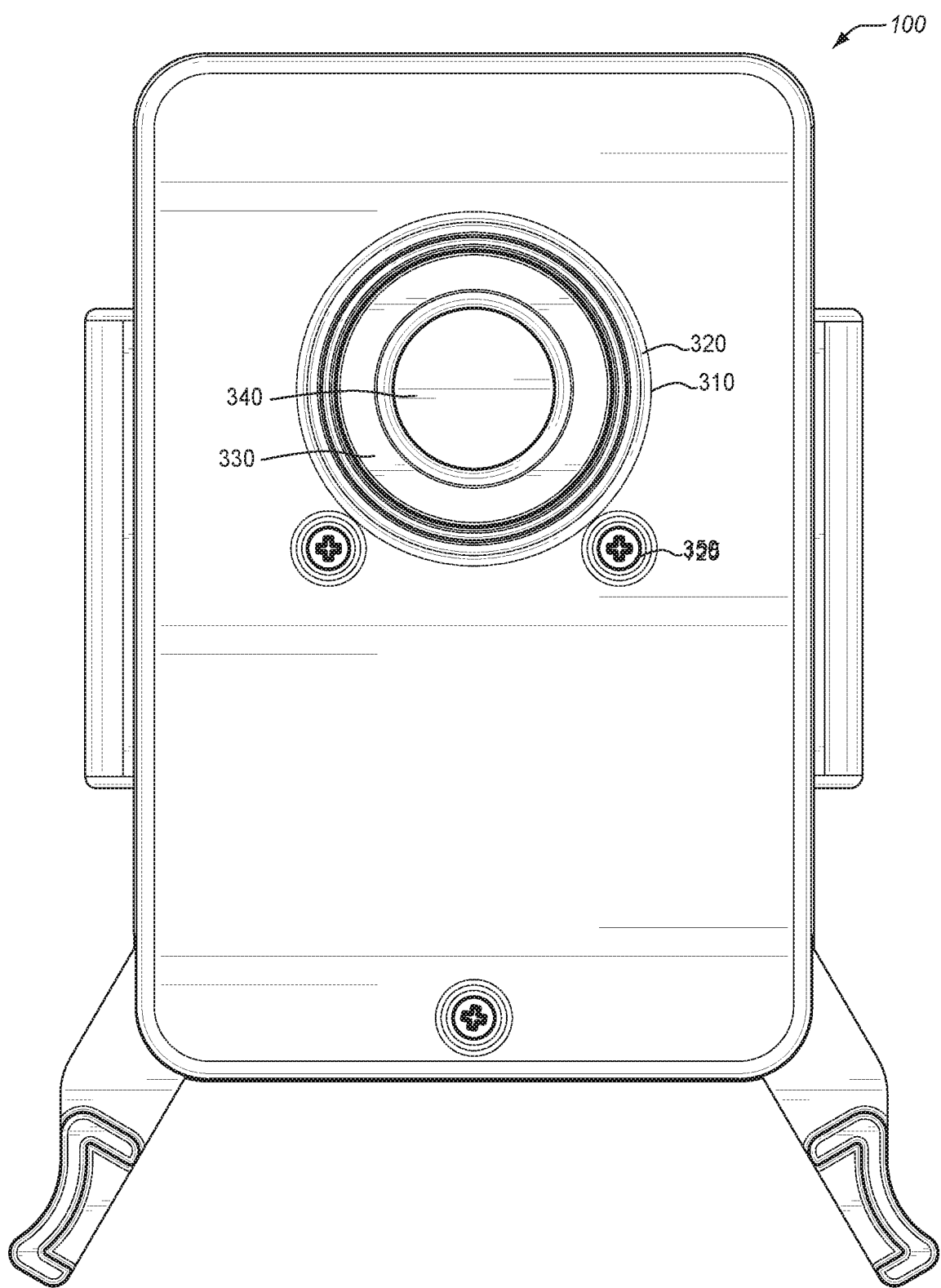
FIG. 3 shows a rear view of the Device Holder of FIG. 1.

FIG. 2 shows a front view of Device Holder 100. FIG. 3 shows a rear view of Device Holder 100. Here, the mounting disk 310 is visible. Mounting disk 310 includes an outer frame 320, a magnet 330, and a high friction material 340. The mounting disk may then be placed on a ball having magnetic material so that the device may be placed, rotated, and positioned as desired by the user. In some embodiment, a magnetic disk as disclosed in U.S. Pat. No. 8,602,376, which is hereby incorporated by reference. Additionally, screws 350 are used to hold the device together. Various other techniques may be used to hold the device together as well.

Figure 4:
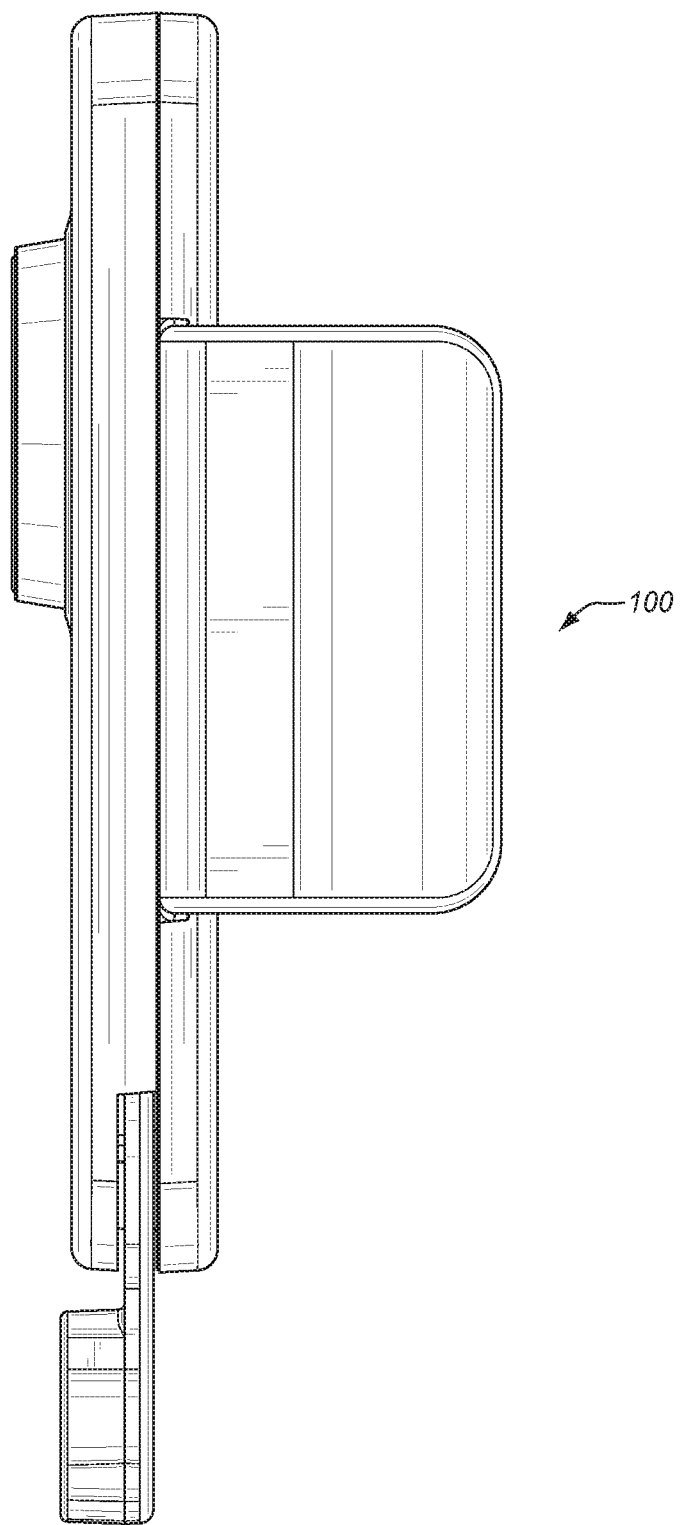
FIG. 4 shows a left side view of the Device Holder of FIG. 1.
Figure 5:
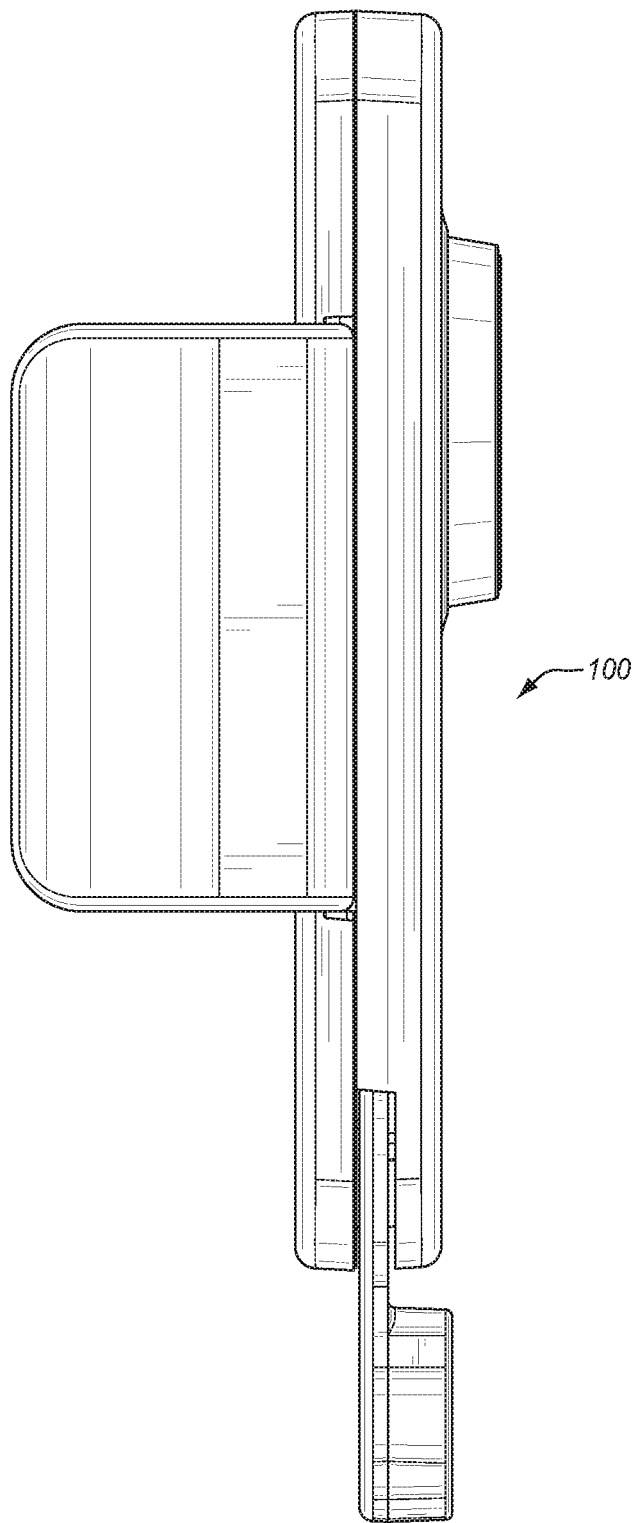
FIG. 5 shows a right-side view of the Device Holder of FIG. 1.
Figure 6:
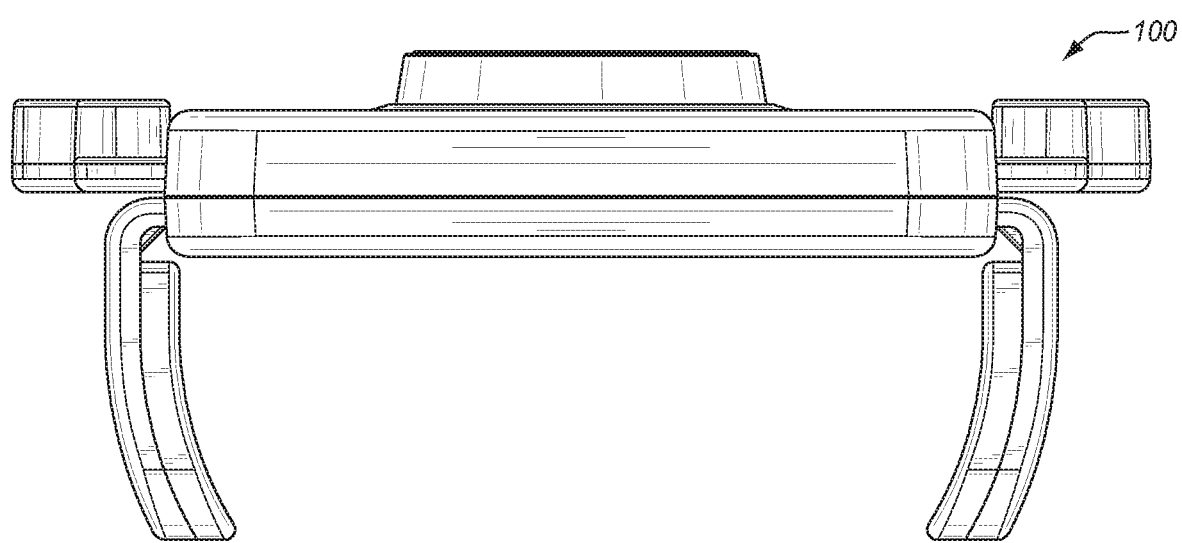
FIG. 6 shows a top view of the Device Holder of FIG. 1.
Figure 7:
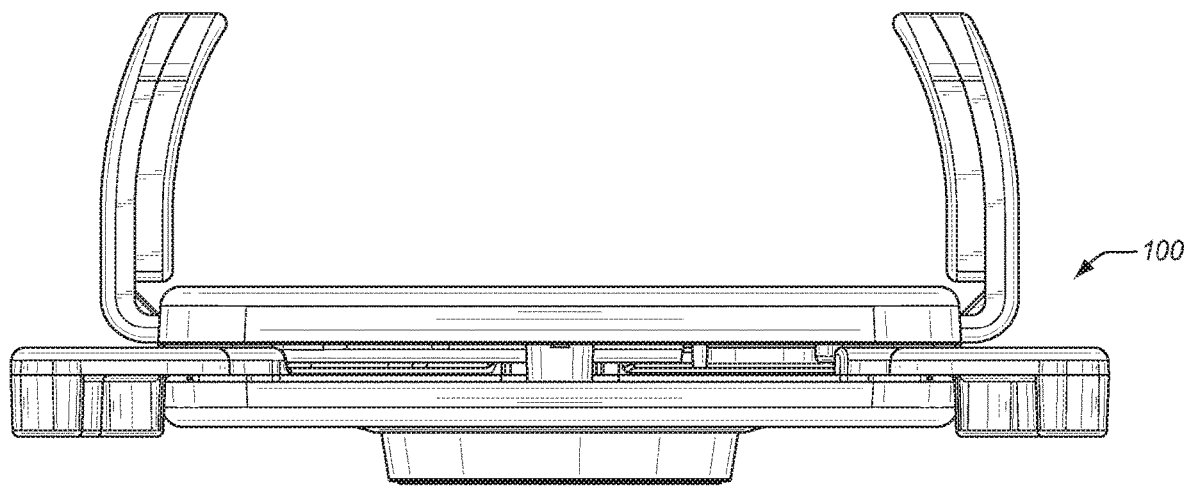
FIG. 7 shows a bottom view of the Device Holder of FIG. 1.
Figure 8:
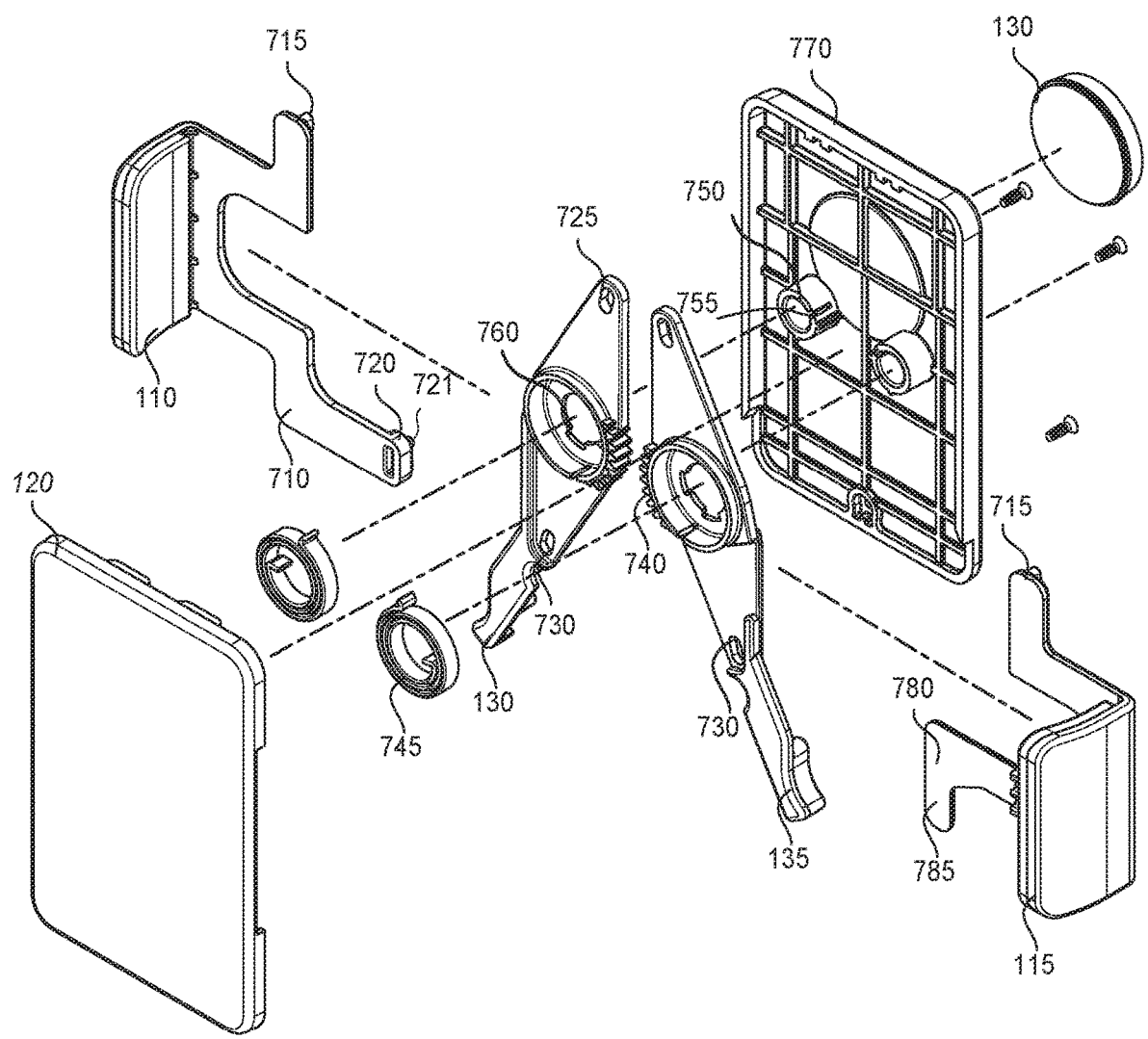
FIG. 8 shows an exploded view of the Device Holder of FIG. 1.

FIG. 4 shows a left side view of Device Holder 100. FIG. 5 shows a right-side view of Device Holder 100. FIG. 6 shows a top view of the Device Holder 100. FIG. 7 shows a bottom view of Device Holder 100. FIG. 8 shows an exploded view of Device Holder 100. Here the internal workings of the device are visible. Gripping plates 110, 115 are mounted on sliding brackets 710, 780. Sliding brackets 710, 780 includes posts 715, 721 that project from the back side of the sliding brackets 710, 780. Additionally, brace 720 is designed to brace against bracing area 785, such that bracing area 785 can slide from being against brace 720 and along sliding bracket 710. Levers 130, 135 are also shown. Levers 130, 135 include apertures 725, 730 for mating with posts 715, 721 respectively. Apertures 725, 730 are slots that enable post 715, 721 to slide up and down the slot. In this way, lever sliding brackets 710,780 attach to both levers 130, 135 in opposite radial positions. The radial movement of the arms is translated into in and out movement of the gripping plates 110, 115 and the sliding of posts 715, 721 in apertures 725, 730. Additionally, sliding bracket 780 includes a post 721, but is not visible in this view. Sliding bracket includes a bracing area 785 that braces and slides against the corresponding area on sliding bracket 710. In this way the movement of levers 130, 135 affects the position of gripping plates 110, 115. Additionally, levers 130, 135 include gearing 740, that provides for levers 130, 135 to move in unison. The stacking arrangement is believed to be secure. Levers 130, 135 are spring loaded via springs 745. Because of this geometry, in some embodiments, the clamping force provided by the gripping plates may be twice the force needed to move the levers. Springs 745 sit on raised apertures 750 and inside of the holes in levers 130, 135. Springs 745 are constant force or clock springs in many embodiments. The spring force provided by such springs is relatively constant. Raised apertures 750 and levers 130, 135 include spring catches 755, 760, where the catch points on springs 745 may push and thereby provide tension to the levers 130, 135. Back 770 holds the device together by attaching to front plate area 125 via screws. Thereby, the design provides for a device that applies constant tension via gripping plates 110, 115, which may be released by pulling levers 130, 135 together. Additionally, by providing a top and bottom attachment point for gripping plates 110, 115 to levers 130, 135, the gripping plates move in unison in an in an out manner and the rotational motion of the levers is converted to in plane, bi-directional motion. In many embodiments, this conversion of rotational motion is accomplished attaching one lever arm to a top and bottom portion of a first sliding bracket and the other lever arm only attaching at one location on a second sliding bracket. The portion of the first bracket attaching to the far or distal lever arm is significantly greater than the portion attaching to the near lever arm. The top of the near lever arm and the bottom of the far or distal lever arm moves in unison with the direction of the first lever arm. Of course, the terms top and bottom, near and far, are merely meant to be relative terms related to the orientations show in the drawings and should be interpreted as such.

Figure 17:
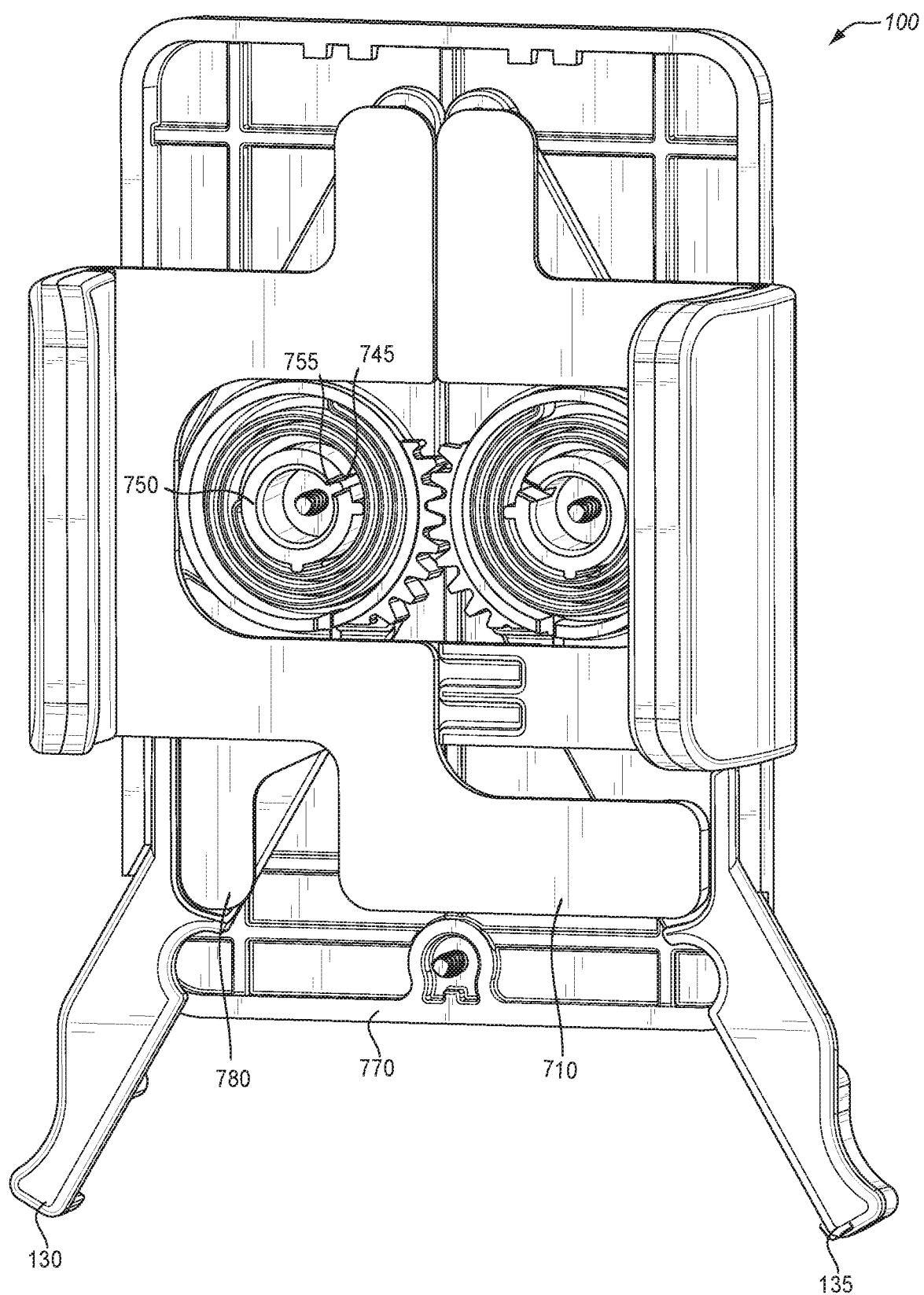
FIG. 17 shows a view of the Device Holder of FIG. 1.

Additionally, FIG. 17 shows a view of Device Holder 100, with gripping area 120 removed. By removing gripping area 120, the way the inner items are assembled is visible. Here we can see how raised apertures 750 and spring catches 755 capture springs 745. Additionally, it is visible how lever sliding brackets 710, 780 sit on top of levers 130, 135. Based on this interconnection, as levers 130, 135 are moved in a rotational direction it can be visualized how the corresponding portions of lever sliding brackets 710, 780 move in unison. It can also be seen that lever sliding bracket 710 sits on top of lever sliding bracket 780 and then both are on top of levers 130, 135, when looking down on the device towards the interior of back 770. This view is common to that of Device Holder 900, save for the backstrap system.

Figure 9:
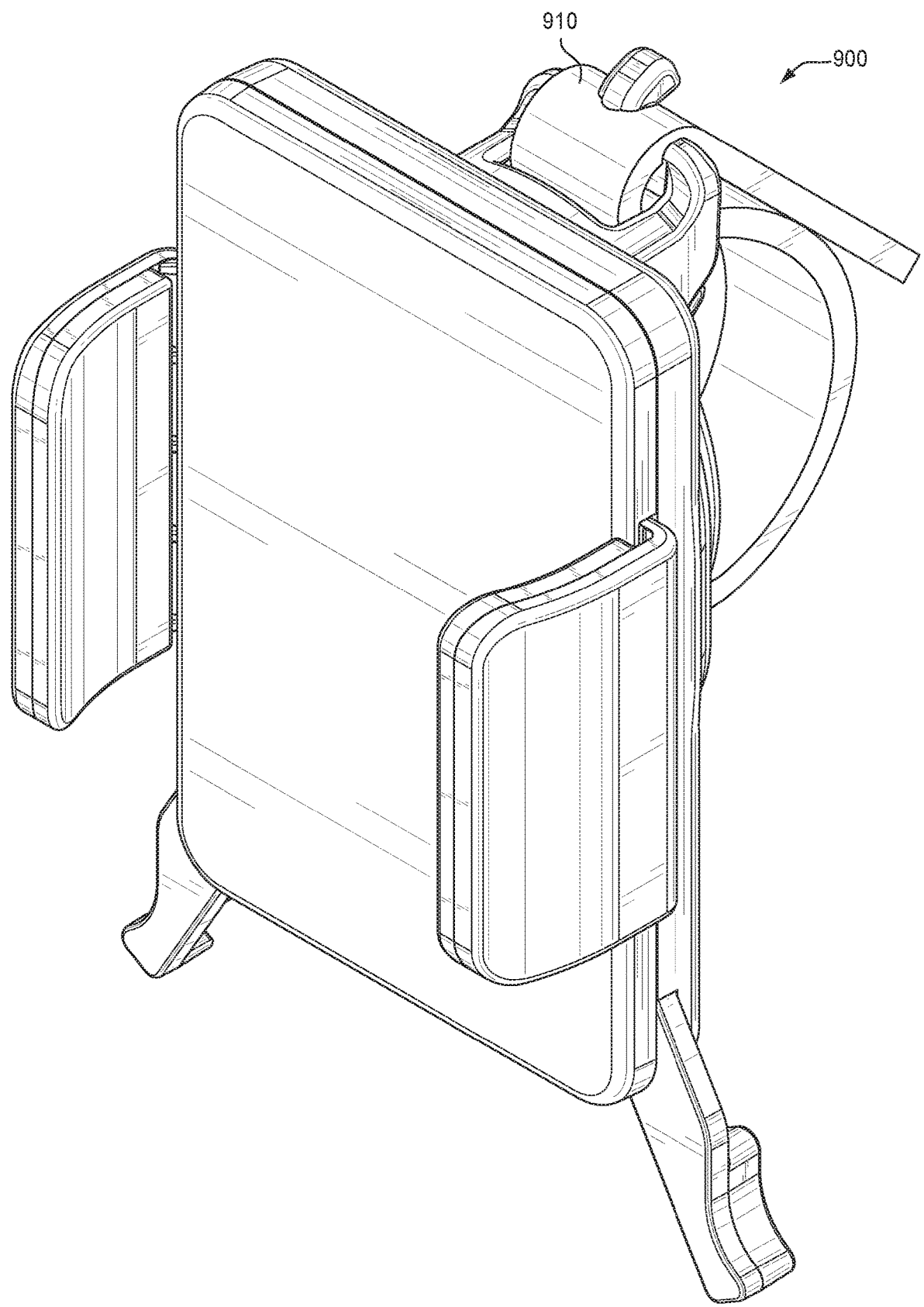
FIG. 9 show a front perspective view of one embodiment of a Device Holder.
Figure 10:
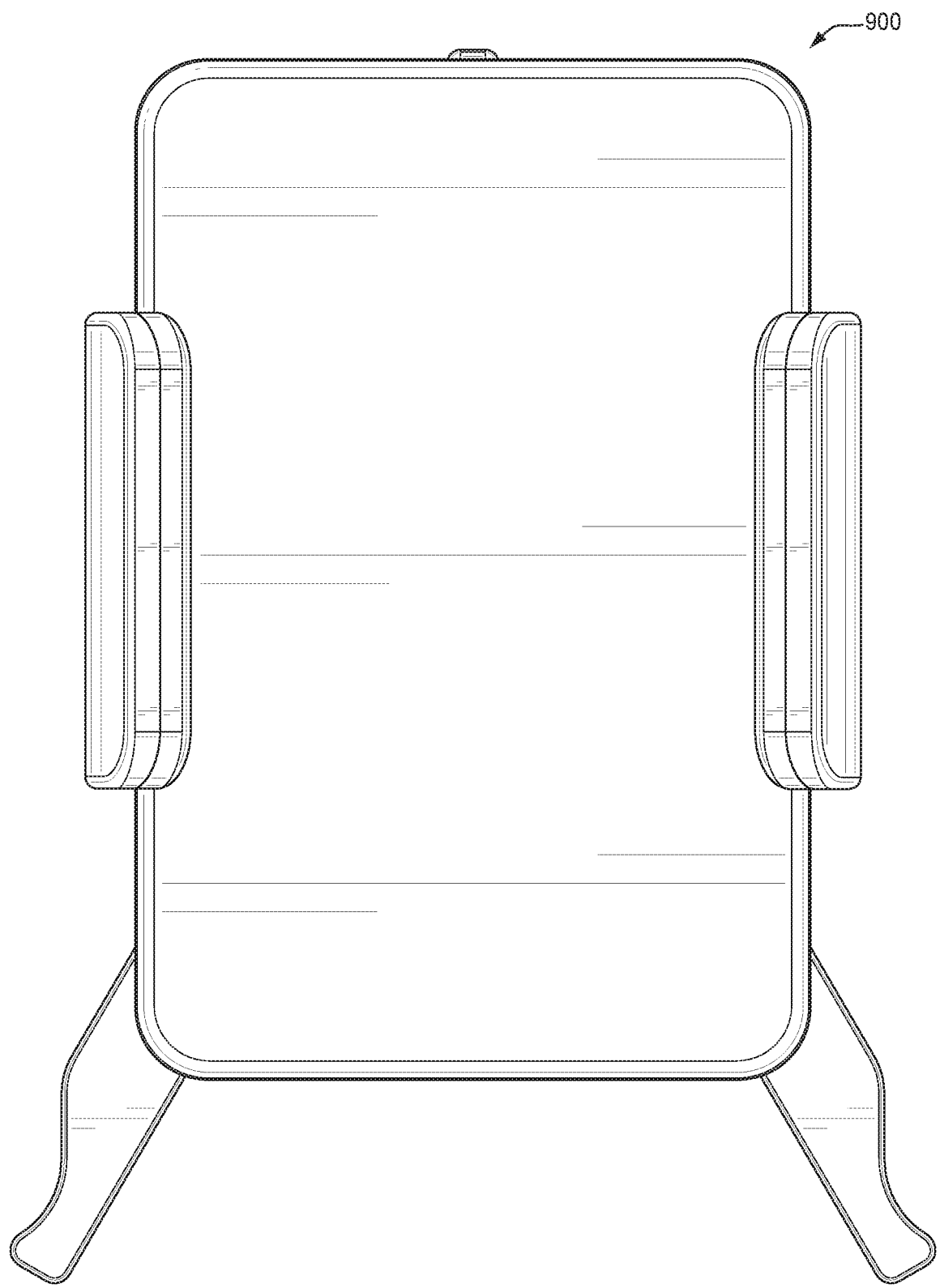
FIG. 10 shows a front view of the Device Holder of FIG. 9.
Figure 11:
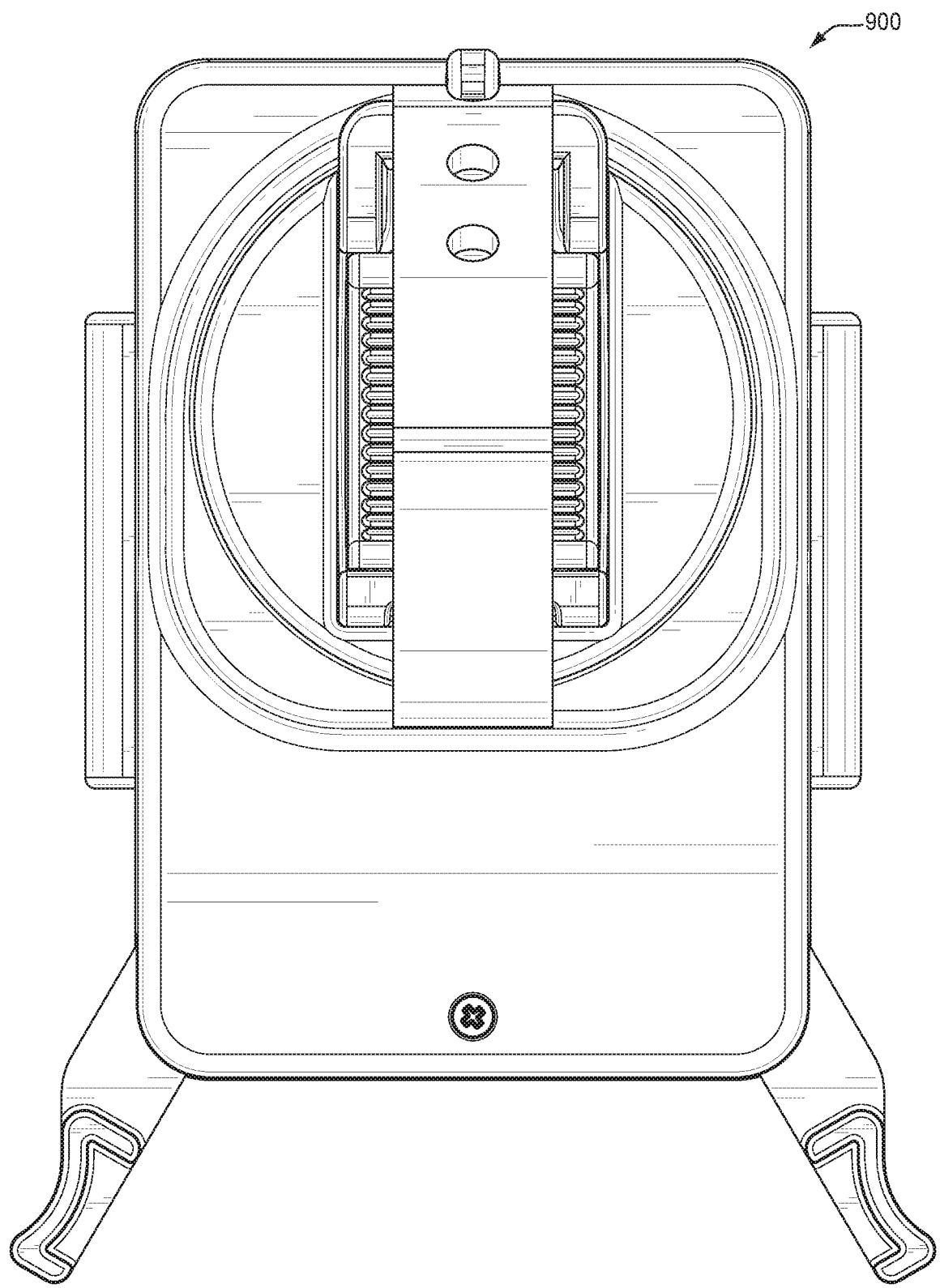
FIG. 11 shows a rear view of the Device Holder of FIG. 9.
Figure 12:
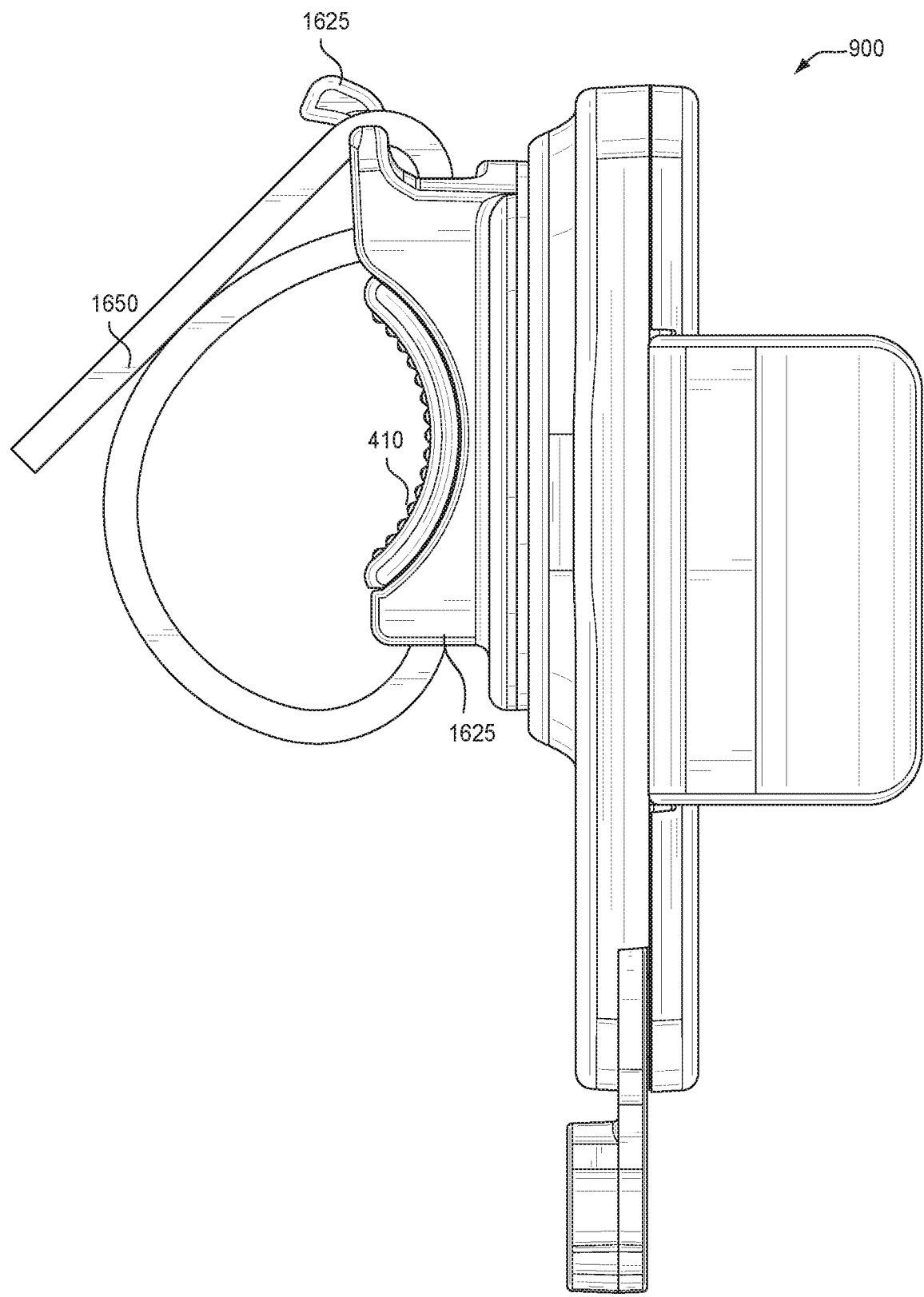
FIG. 12 shows a left side view of the Device Holder of FIG. 9.
Figure 13:
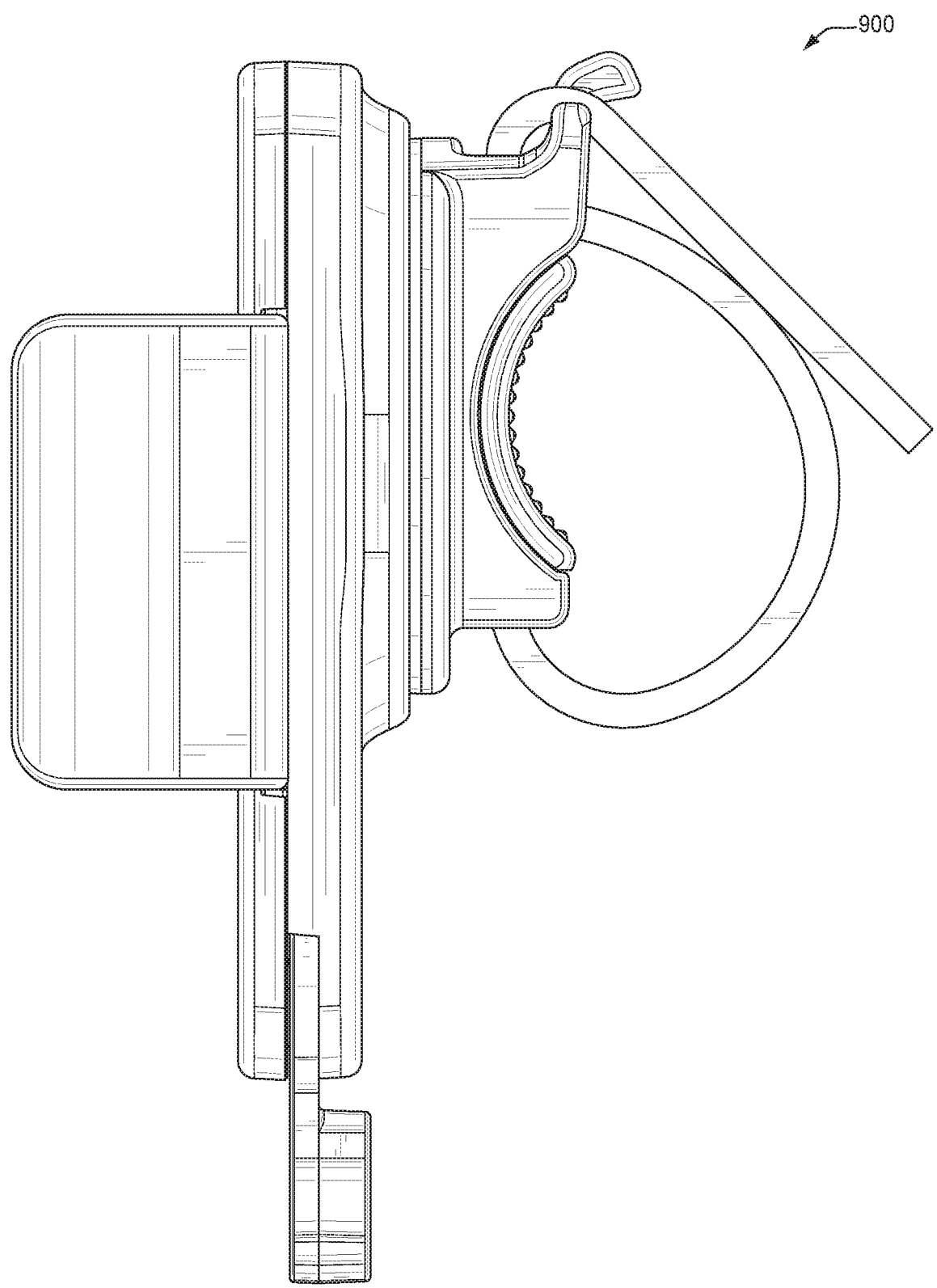
FIG. 13 shows a right-side view of the Device Holder of FIG. 9.
Figure 14:
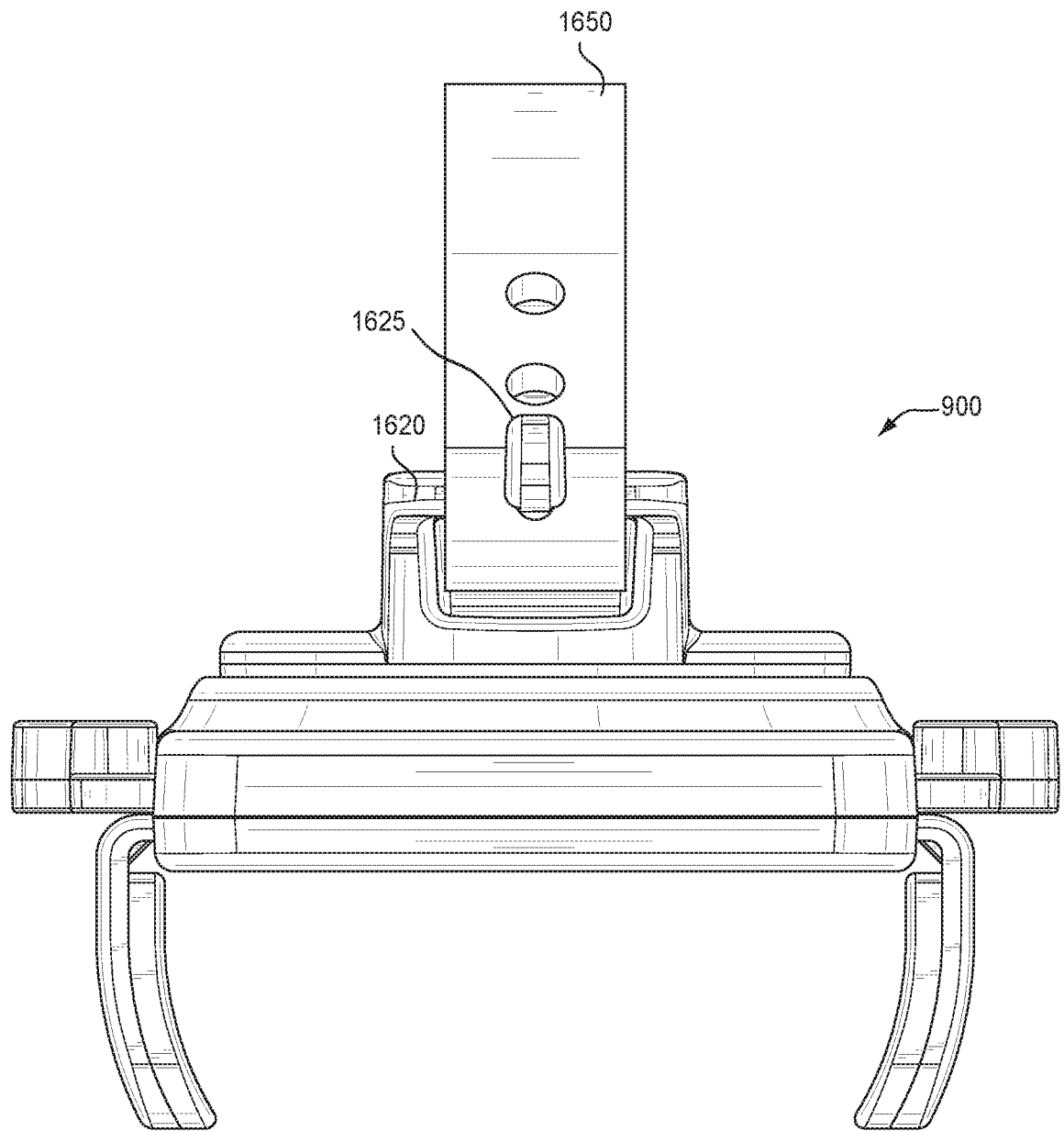
FIG. 14 shows a top view of the Device Holder of FIG. 9.
Figure 15:
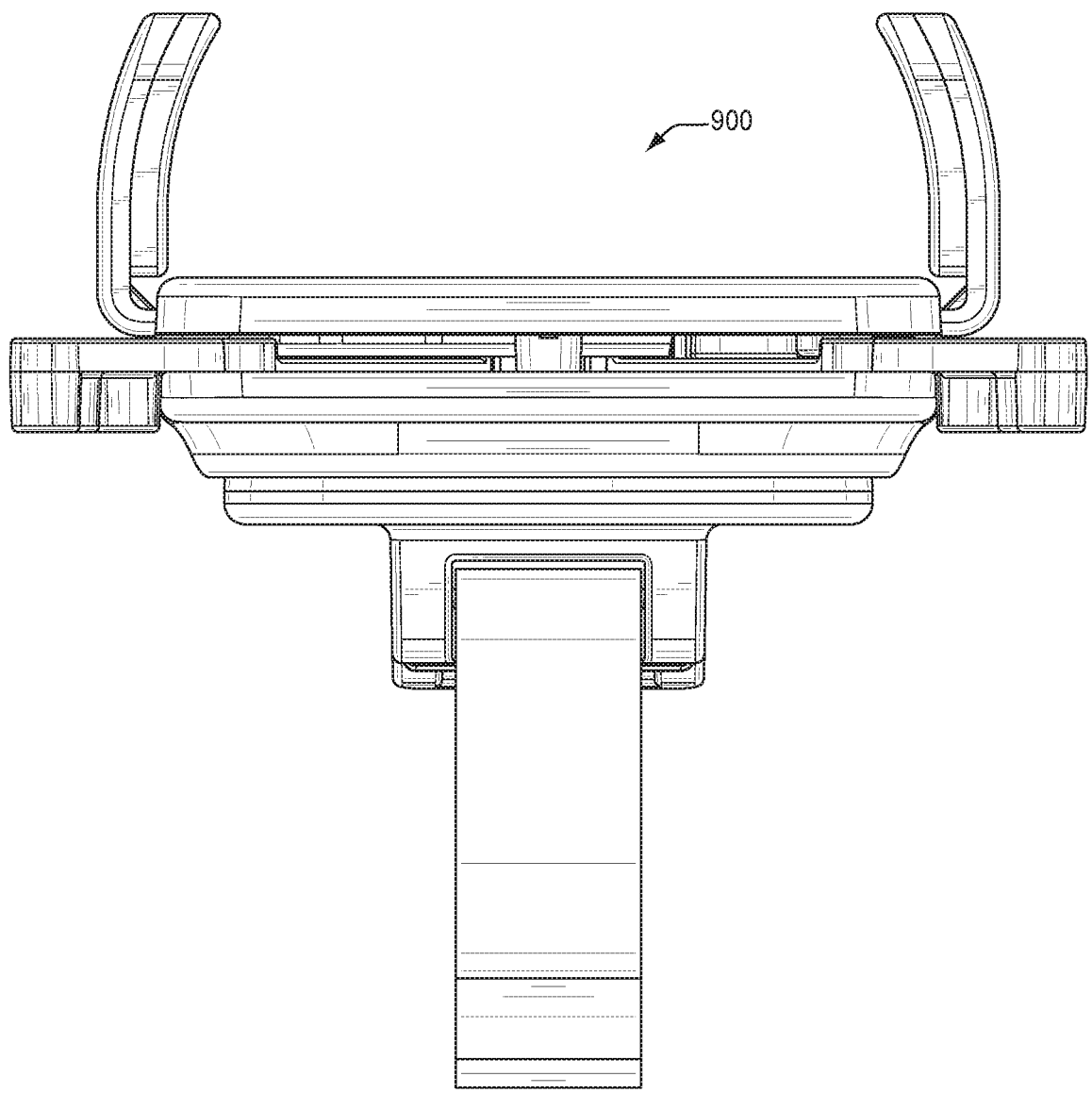
FIG. 15 shows a bottom view of the Device Holder of FIG. 9.

FIG. 9 shows an alternative embodiment of a Device Holder 900 whereby the back magnetic portion has been substituted for a backstrap system 910. In alternatives, many different holders/devices may be incorporated into the back portion of the device. In some alternatives, this may be a handle, stand, or lanyard in place of the backstrap system of magnetic back. Additionally, alternatives may include a wrist attachment or bracelet system, allowing the device to be worn. Additionally, alternatives may include a stand system that attaches to a vent, adheres to a surface (via adhesive), or sticks to a window or other surface using a suction cup. Additionally, a stand may be provided, and, in some alternatives, a flexible arm may be provided and attach to the back of the Device Holder. The Device Holder may be integrated into or include any possible mounting and holding system. Backstrap system 910 is designed for strapping to a cylindrical object such as a handle bar. The other aspects of the device in this system are essentially the same. FIG. 10 shows a front view of Device Holder 900. FIG. 11 shows a rear view of Device Holder 900. FIG. 12 shows a left side view of Device Holder 900. FIG. 13 shows a right-side view of Device Holder 900. FIG. 14 shows a top view of the Device Holder 100. FIG. 15 shows a bottom view of Device Holder 900.

Figure 16:
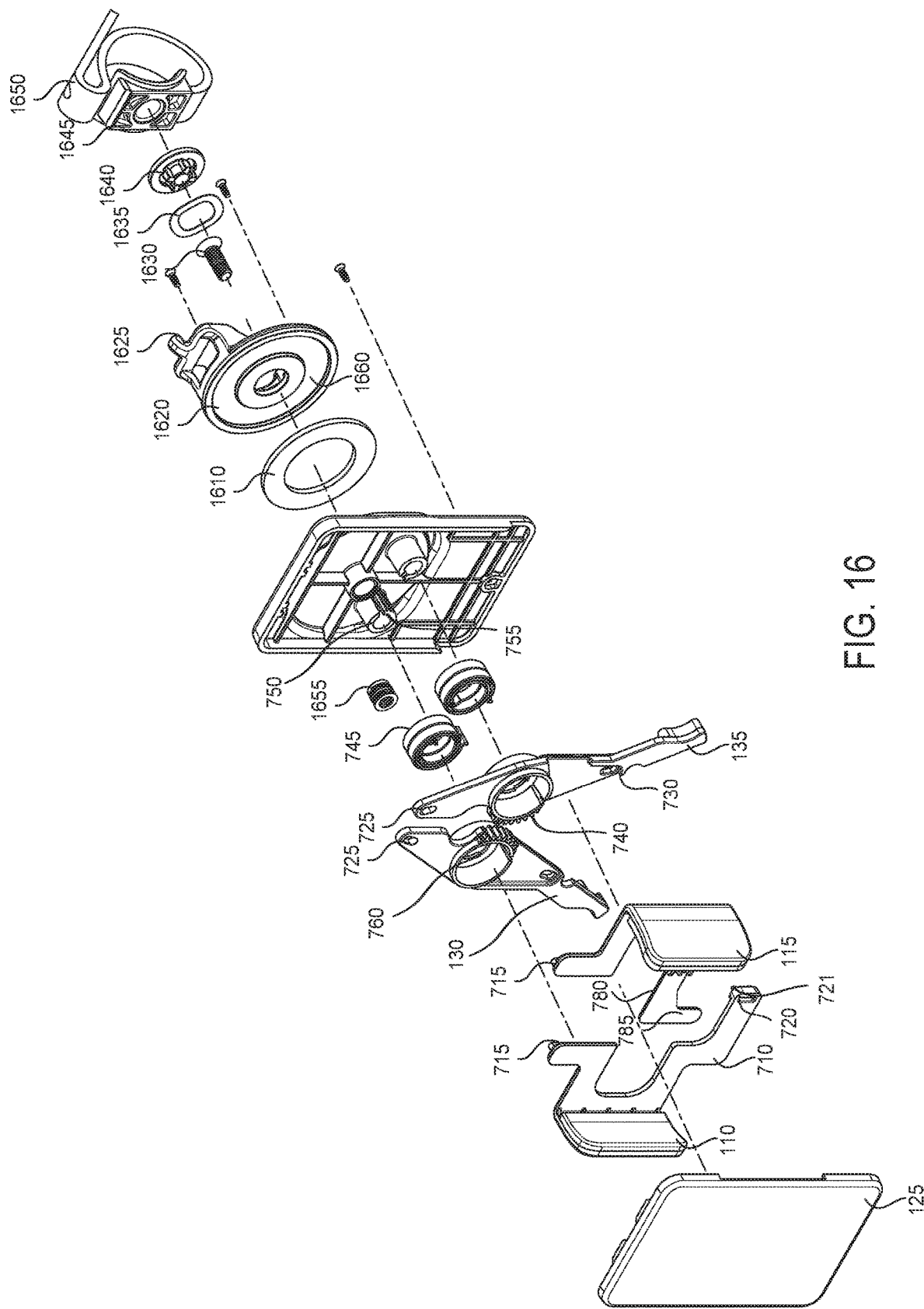
FIG. 16 shows an exploded view of the Device Holder of FIG. 9.

FIG. 16 shows an exploded view of Device Holder 900. Here the internal workings of the device are visible. Gripping plates 110, 115 are mounted on sliding brackets 710, 780. Sliding brackets 710, 780 includes posts 715, 721 that project from the back side of the sliding brackets 710, 780. Additionally, brace 720 is designed to brace against bracing area 785, such that bracing area 785 can slide from being against brace 720 and along sliding bracket 710. Levers 130, 135 are also shown. Levers 130, 135 include apertures 725, 730 for mating with posts 715, 721 respectively. Apertures 725, 730 are slots that enable post 715, 721 to slide up and down the slot. In this way, lever sliding brackets 710,780 attach to both levers 130, 135 in opposite radial positions. The radial movement of the arms is translated into in and out movement of the gripping plates 110, 115 and the sliding of posts 715, 721 in apertures 725, 730. Additionally, sliding bracket 780 includes a post 721, but is not visible in this view. Sliding bracket includes a bracing area 785 that braces and slides against the corresponding area on sliding bracket 710. In this way the movement of levers 130, 135 affects the position of gripping plates 110, 115. Additionally, levers 130, 135 include gearing 740, that provides for levers 130, 135 to move in unison. The gearing 740 keeps the levers and gripping plates mechanically synchronized, eliminates the need for tracks for the levers and gripping plats, and keeps the gripping plates (clamps) centered. Levers 130, 135 are spring loaded via springs 745. Springs 745 sit on raised apertures 750 and inside of the holes in levers 130, 135. Raised apertures 750 and levers 130, 135 include spring catches 755, 760, where the catch points on springs 745 may push and thereby provide tension to the levers 130, 135. Back 770 holds the device together by attaching to front plate area 125 via screws. Thereby, the design provides for a device that applies constant tension via gripping plates 110, 115, which may be released by pulling levers 130, 135 together. Additionally, by providing a top and bottom attachment point for gripping plates 110, 115 to levers 130, 135, the gripping plates move in unison in an in an out manner and the rotational motion of the levers is converted to in plane, bi-directional motion. In many embodiments, this conversion of rotational motion is accomplished attaching one lever arm to a top and bottom portion of a first sliding bracket and the other lever arm only attaching at one location on a second sliding bracket. The portion of the first bracket attaching to the far or distal lever arm is significantly greater than the portion attaching to the near lever arm. The top of the near lever arm and the bottom of the far or distal lever arm moves in unison with the direction of the first lever arm. Of course, the terms top and bottom, near and far, are merely meant to be relative terms related to the orientations show in the drawings and should be interpreted as such.

Additionally, backstrap system 910 is visible in an exploded view. This system is designed to wrap around a cylindrical object. This system includes a friction disc 1610, which may be made of a rubberized or other high friction material. Friction disc 1610 interfaces with body 1620 in slot 1660, which is shaped in a complementary fashion. Body 1620 includes prong 1625, which is designed to interface with the holes in rubberized belt portion 1650. Screw 1630 cooperates with threaded insert 1655 in order to hold the assembly of backstrap system 910 together. Screw 1630 actually fits on the other side of strap holder 1645 such that it sandwiches all of the parts. Spring 1635 provides pressure and tension to the backstrap system 910 when assembled, such that the friction of friction disc, the back 770, and body 1620 is sufficient to resist movement. At the same time the spring 1635 may be compressed and the device may be turned in relation to the back 770. Spring 1635 may be a wave disc spring in many embodiments. Backstrap system 910 also includes boss 1640 which assists in the interconnection of the parts. In operation, as shown in FIGS. 12 and 14, rubberized belt portion 1650 is wrapped through an aperture in body 1620 and then a hole of the rubberized belt portion 1650 is placed on prong 1625. Body portion 1625 may also include a high friction area 410 or rubberized or flexile material that increases the attachment friction of the device. Since belt portion 1650 is made to be stretchy, tension applied to a cylindrical or other irregular object placed between belt portion 1650 and high friction area 410.

In many embodiments of the device holder, a gripping area is provided for gripping an electronic device. The gripping area is spring loaded to provide gripping force on an object placed between two gripping plates. Two release levers are provided to release the gripping force of the gripping area. The gripping plates move in single plane of movement in and out. The release levers move in a rotational fashion. The device holder is designed to convert the rotational movement of the release levers to a single plane of movement for the gripping plates. This is accomplished via gearing between the arms and a sliding bracket for one of the gripping plates that is attached to a first one of the arms at a first location and a second one of the arms at a second location. The arms have a central rotation point. The first location on the first arm is a first distance from the central rotation point. The second location of the second arm is the same first distance from its central rotation point. When the first and second arms rotate, the gripping plate is pulled in the same direction by the first and second arm as the first and second arm rotate in opposite directions, however the translated single plane movement is in the same direction. At the attachment locations, a post in slot arrangement is used so that the post may slide in the slot in order to compensate the translation of the rotation motion of the arms into planar/linear movement. Additionally, a variety of interconnection mechanisms may be on the back side of the device holder. This includes but is not limited to the magnetic system shown and the cylindrical interconnection system shown, as well as clamps, magnets, Velcro, snap fit systems, pressure fit systems, adhesives, and other fasteners (like screws, bolts, etc.).

While specific embodiments have been described in detail in the foregoing detailed description and illustrated in the accompanying drawings, it will be appreciated by those skilled in the art that various modifications and alternatives to those details could be developed in light of the overall teachings of the disclosure and the broad inventive concepts thereof. It is understood, therefore, that the scope of this disclosure is not limited to the particular examples and implementations disclosed herein but is intended to cover modifications within the spirit and scope thereof as defined by the appended claims and any and all equivalents thereof.

What is claimed is:

1. A system for holding an electronic device, the system comprising:
   a body portion, the body portion having a surface;
   a first gripping plate and a second gripping plate, each of the first and second gripping plates including a holding surface approximately perpendicular to the surface; and
   first and second arms interconnected with the first and second gripping plates such that the first and second arms are rotationally movable and the first and second gripping plates are linearly moveable, wherein:
      the first and second gripping plates are spring driven to move together,
      the first and second gripping plates are configured to move apart when the first and second arms are moved together,
      the first and second gripping plates are complementarily shaped to hold the electronic device, and
      the first and second arms are interconnected via gearing to move together;
   wherein the first gripping plate includes a first bracket, the first bracket attached to the first arm and the second arm.

2. The system of claim 1, wherein the first and second arms are mounted at first and second rotation points, respectively, and the first bracket is attached to the first arm at a first radial distance from the first rotation point and to the second arm at a second radial distance from the second rotation point.

3. The system of claim 2, wherein the first bracket is attached to the first arm and the second arm via a post-in-slot system.

4. The system of claim 3, wherein a second bracket is attached to the first arm at the second radial distance from the first rotation point and to the second arm the first radial distance from the second rotation point and the second bracket is attached to the first arm and the second arm via a post-in-slot system.

5. The system of claim 4, wherein the second bracket and the first bracket interconnect with the first arm in locations opposite the first rotation point.

6. The system of claim 5, wherein the first and second arms are spring-loaded and thereby cause the first and second gripping plates to be spring driven.

7. The system of claim 3, wherein the first and second brackets, the gearing, and the post-in-slot system convert a rotational motion of the first and second arms to linear motion in and out of the first and second gripping plates.

8. The system of claim 7, wherein a cylindrical mounting device is mounted on the body portion.

9. The system of claim 8, wherein the cylindrical mounting device includes a strap and prong attachment mechanism.

10. The system of claim 9, wherein the cylindrical mounting device includes a flat spring which flexes to allow the cylindrical mounting device to rotate.

11. The system of claim 2, wherein the first and second rotation points are located on a line in-line with a direction of movement of the first and second gripping plates.

12. The system of claim 11, wherein the first and second rotation points are separated from each other.

13. The system of claim 1, wherein a magnetic interconnect device is mounted on the body portion.

14. A method of mounting an electronic device, the method comprising:
   providing a holding system, the holding system including:
      a body portion, the body portion having a surface;
      a first gripping plate and a second gripping plate, each of the first and second gripping plates including a holding surface approximately perpendicular to the surface; and
      first and second arms interconnected with the first and second gripping plates such that the first and second arms are rotationally movable and the first and second gripping plates are linearly moveable, the first and second gripping plates are spring driven to move together, the first and second gripping plates configured to move apart when the first and second arms are moved together, the first and second gripping plates being complementarily shaped to hold the electronic device, the first and second arms interconnected via gearing to move together, wherein the first gripping plate includes a first bracket, the first bracket attached to the first arm and the second arm;
   pushing the first and second arms together;
   inserting the electronic device between the first and second gripping plates;
   releasing the first and second arms.

15. The method of claim 14, further comprising:
   pushing the first and second arms together;
   removing the electronic device between the first and second gripping plates; and
   releasing the first and second arms.

* * * * *